(12) United States Patent
Lowdon

(10) Patent No.: US 6,456,825 B1
(45) Date of Patent: Sep. 24, 2002

(54) CHANNEL ALLOCATION IN RADIO TELEPHONE SYSTEMS

(75) Inventor: Christopher John Lowdon, Impington (GB)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/446,622

(22) PCT Filed: Mar. 31, 1999

(86) PCT No.: PCT/GB99/01005

§ 371 (c)(1), (2), (4) Date: Dec. 23, 1999

(87) PCT Pub. No.: WO99/56491

PCT Pub. Date: Nov. 4, 1999

(30) Foreign Application Priority Data

Apr. 28, 1998 (GB) ............................................. 9809009

(51) Int. Cl.⁷ ............................................... H04B 15/00
(52) U.S. Cl. .......................... 455/62; 455/63; 455/67.1; 455/450
(58) Field of Search ................................. 455/450, 509, 455/62, 63, 67.1, 67.3; 370/329, 341

(56) References Cited

U.S. PATENT DOCUMENTS 5,214,789 A * 5/1993 George ........................ 455/450
5,740,046 A   4/1998 Elestedt ....................... 364/436
6,301,238 B1 * 10/2001 Hagerman et al. .......... 455/562

FOREIGN PATENT DOCUMENTS

GB          2302481         1/1997
GB          2313742         12/1997

* cited by examiner

Primary Examiner—Lee Nguyen
(74) Attorney, Agent, or Firm—Perman & Green, LLP

(57) ABSTRACT

A radio telephone system has a plurality of base stations 3, 4 and a plurality of mobile radios. The position of the mobile radios are determined by combining information at the base stations 3, 4 with information from additional position indicators, such as beacons 16a, 16b, 16c placed at intervals alongside a railway track 8. This enhanced information on the positions of the mobile radios enables channels to be reused on mobile radios with less physical separation than hitherto, thereby improving the efficiency of channel allocation.

4 Claims, 2 Drawing Sheets

CHANNEL ALLOCATION IN RADIO TELEPHONE SYSTEMS

CROSS-REFERENCES TO RELATED APPLICATIONS

This is a National Phase Application based on PCT International Application No. PCT/GB99/01005 filed Mar. 31, 1999.

STATEMENT REGARDING FEDERALLY SPONSORED RESEARCH OR DEVELOPMENT

Not Applicable

REFERENCE TO A "Microfiche Appendix"

Not Applicable

BACKGROUND OF THE INVENTION

1. Field of the Invention

This invention relates to channel allocation in radio telephone systems.

2. Description of Prior Art

When designing a radio channel plan for a radio network it is necessary to provide sufficient geographical distance between radio sites such that their coverage does not cause mutual interference when using a common frequency. At the same time it is desirable to re-use each radio frequency or channel as many times as possible within the network so as to make maximum use of scarce radio spectrum. The radio plan must take account of the worst conditions that could prevail. This means taking into account the most extreme interference conditions brought about by the geographical location of potentially interfering mobile radios.

BRIEF SUMMARY OF THE INVENTION

A scheme which can identify the location of mobile radios in order to determine the likelihood of such interference can enable greater efficient use of the available radio channels. Where all interfering mobile radios are found to be distant to the area of potential re-use, the system can use the channel for a new call in the knowledge that sufficient radio separation has been achieved.

A particular practical application of the invention is that of an underground railway. In this application the radio environment is well defined since radio propagation is restricted to tunnel routes. Furthermore radio coverage may have been further localised by the use of radiating cable which may be cut into lengths served by separate radio base stations thereby creating radio coverage areas.

According to one aspect of the invention a radio telephone system comprises a plurality of mobile telephones, a plurality of base stations and positioning means operative to determine the position of mobile radios, the system having channel allocation means into which is loaded information regarding first and second conditions for determining channel allocation, the first condition being based on avoiding interference in areas served by the base stations and the second condition being based on avoiding interference in areas served by the positioning means, the channel allocation means being operative to determine if a channel is in use in an interfering zone by using the first condition arid, if the first condition is not met, determining if the channel is in use in an interfering sub-zone by using the second condition.

According to another aspect of the invention there is provided a method of allocating a channel to a mobile radio in a radio telephone system having a plurality of base stations, comprising determining if a channel is in use in an interfering zone by using a first condition based on avoiding interference in areas served by the base stations and, if the first condition is not met, determining if the channel is in use in an interfering sub-zone by using a second condition based on avoiding interference in areas served by positioning means distinct from the base stations.

In a preferred embodiment the positioning means are beacons in radio communication with the mobile radios. Where the invention is applied to a radio telephone system in a railway underground system, the beacons may be the train control beacons which are conventionally placed at intervals along the underground railway track. For an above ground application, the positioning means may be provided by beacons or by a more accurate positioning system, eg known positioning systems using satellites.

The method is of particular benefit where radio frequencies are scarce and must be re-used over short geographical distances. The method is particularly applicable to a tightly controlled radio environment such as a railway or other pre-defined vehicular route. The method enables radio frequencies to be re-used with greater regularity than would be possible by pure radio voting or RF propagation techniques. The invention relies on the use of the positioning means (physical location beacons or other geographical positioning systems) to identify precise location information of the mobile radio and thereby enable radio channels to be re-used more regularly without causing co-channel interference. Without the use of the invention it is necessary to allocate more radio frequencies in order to achieve the same grade of service.

Under normal circumstances the location of potentially interfering mobile radios can only be defined by the radio coverage limits of each base station. The use of location information from signalling beacons existing on the railway can enable the radio system to determine more precise location information within the coverage area. In this way a mobile radio which (for example), whilst using a radio channel, is about to exit a particular coverage area, will not cause radio interference to another radio using the same radio channel some distance behind it in the previous coverage area. By knowing that the two radios are sufficiently separated the channel can be re-used with safety.

BRIEF DESCRIPTION OF THE SEVERAL VIEWS OF THE DRAWINGS

The invention will now be described, by way of example, with reference to the accompanying drawings, in which.

DETAILED DESCRIPTION OF THE INVENTION

Figure 1:
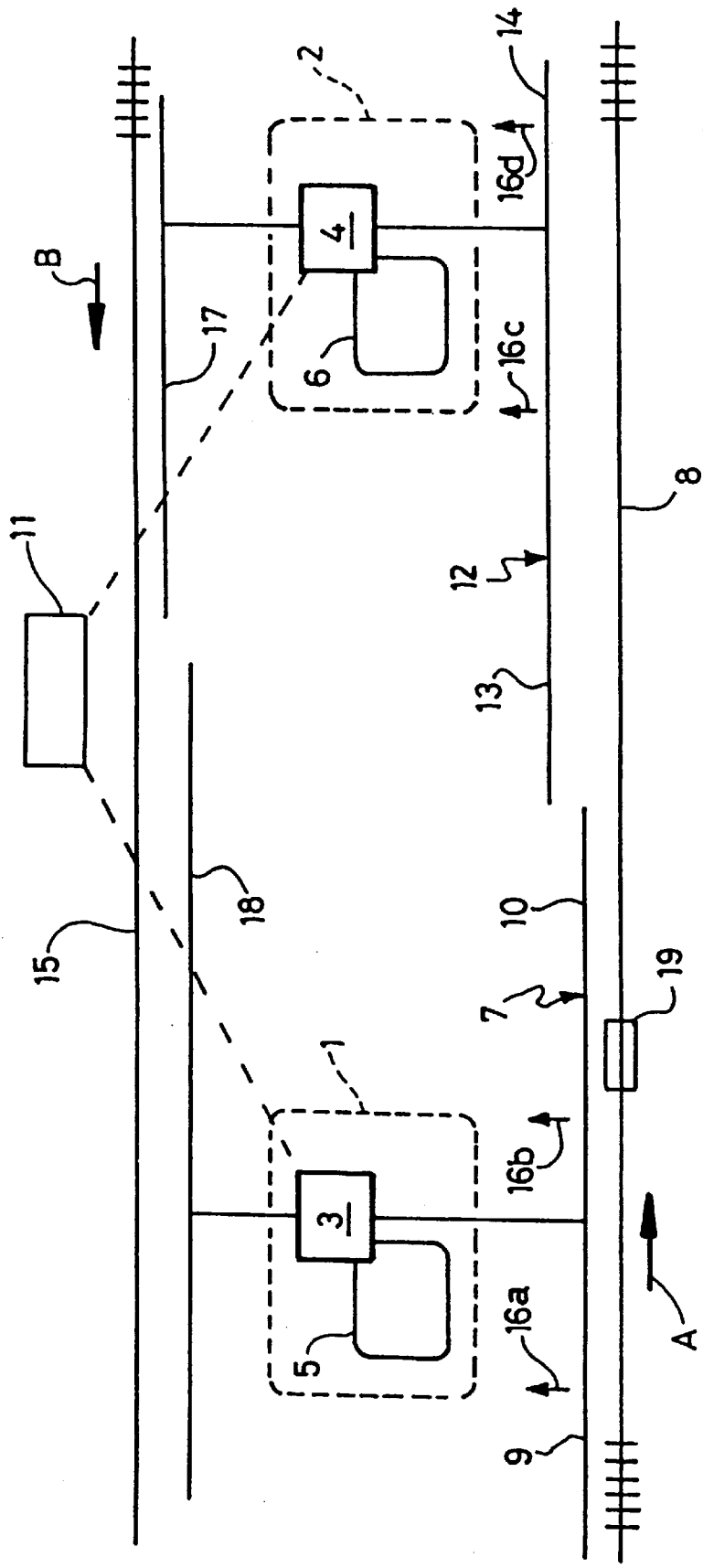
FIG. 1 is a diagram of a radio telephone system according to the invention as fitted in an underground railway.

Referring to FIG. 1, two successive railway stations on an underground railway line are indicated at 1 and 2. The railway stations have respective base stations 3 and 4 which are similar to base stations in a cellular radio system in that each base station is linked, generally by hard wiring, to a mobile controller 11 and thence to a telephone exchange. The base stations 3 and 4 have respective cable loops 5 and 6 which extend around the areas of the railway stations (e.g. platforms, subways and concourse) so that people equipped with mobile handsets cart make and receive telephone calls through the respective base stations 3 and 4.

The base station 3 also feeds a radiating cable 7 which extends along the tunnel bore linking the stations 1 and 2. The bore accommodates a single length of railway track 8 along which trains normally run in the same direction, indicated by arrow A. The cable 7 has a first portion 9 extending from the station 1 towards the preceding railway station and a second portion 10 extending from the station 1 towards the next station 2.

Similarly, the base station 4 feeds a second cable 12 in the bore, the cable 12 having a first portion 13 extending towards the station 1 and a second portion 14 extending towards the next railway station along the line. The cables 7 and 12 are leaky or lossy in that they radiate radio fields corresponding to the electrical signals from the respective base stations 3 and 4. The cables 7 and 12 are supported by hangers on the walls of the bore so that the cables 7 and 12 extend longitudinally within the bore accommodating the track 8 along which the trains pass (in direction A) from the station 1 to the station 2. A second tunnel bore accommodating a second railway track 15 is provided to take trains in the opposite direction B from the station 2 to the station 1, this track 15 being served by leaky cables 17, 18.

The underground railway system is equipped, in known manner, with beacons 16a, 16b, 16c which communicate by radio with a transceiver on the front of each train. The beacons are linked to a controller monitoring system which is capable of determining the position of each train, within an accuracy corresponding to the spacing of the beacons. The beacons are generally provided at the entry and exit of each station, and sometimes beacons are provided beside the railway tracks at one or more spaced locations between railway stations.

In the example shown in FIG. 1, beacons 16a and 16b are respectively provided at the entry and exit of the railway station 1, and beacons 16c and 16d are respectively provided at the entry and exit of the railway station 2.

By recourse to the invention, the positional information of each train derivable from the base station with which it is in communication is combined with the positional information from the beacons to improve knowledge about the position of the train and thereby enable channels to be allocated more efficiently. For example, suppose a train 19 has just left the platform at station 1, as illustrated in FIG. 1. The departure of the train 19 from the platform of station 1 will be detected by the beacon 16b. If the mobile radio on the train is still in communication with the base station 3 through the cable 7 the mobile controller will be able to determine, from the combined signals from the beacons 16a, 16b . . . and the base stations 3 and 4, that the train 19 is in the first part of the tunnel bore i.e. between the beacon 16b and the region where the train radio transfers its communication from cable 7 to cable 12.

Figure 2:
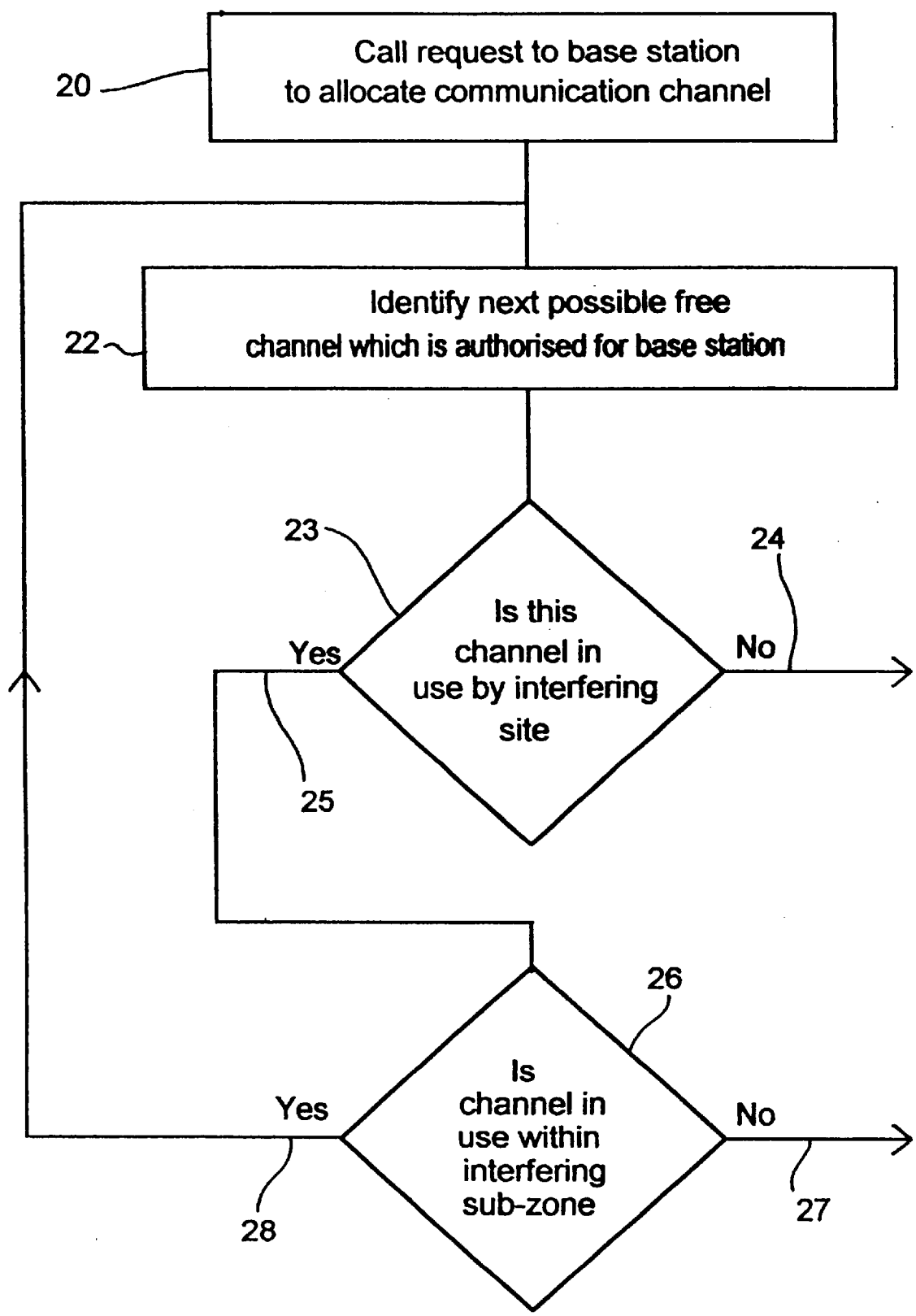
FIG. 2 is a logic diagram of the steps followed in allocation of a channel to a mobile radio.

Suppose that there is a need to allocate a communication channel to the base station 3. This requirement is illustrated by reference 20 in FIG. 2. The controller 11 identifies the next possible channel authorised for the base station 3, reference 22 in FIG. 2. The controller 11 then decides whether this channel is in use in an interfering site, reference 23 in FIG. 2. The test in box 23 is to determine if the channel satisfies a first condition which is based on avoiding interference in areas served by the base stations. This test for compliance with the first condition is the conventional test undertaken when allocating channels to a base station.

If the answer to the test undertaken in box 23 is no, the channel is allocated, branch 24. If the answer is yes (branch 25) the controller undertakes another test (box 26) by determining if the channel is in use within an interfering sub-zone which is predefined and information of which is preloaded into the controller. For example, a sub-zone could be defined as being half the separation between railway stations, meaning that mobile radio telephones on the same channel would have to be separated by at least half the distance between adjacent stations.

With this information loaded into the controller and forming the second condition, the controller undertakes the test (box 26) for compliance with the second condition and, if the test result is no (branch 27), the channel is allocated. If the test result is yes the system loops back, as indicated by reference 28, for identification of the next possible free channel.

Thus, by using information from the trackside beacons 16a, 16b . . . to define the position and direction of movement of the mobile radio on the train, the controller can allocate radio frequency channels with greater efficiency than by reliance on information from the base stations alone.

What is claimed is:

1. A radio telephone system comprising a plurality of mobile telephones, a plurality of base stations and positioning means operative to determine the position of mobile radios, the system having channel allocation means into which is loaded information regarding first and second conditions for determining channel allocation, the first condition being based on avoiding interference in areas served by the base stations and the second condition being based on avoiding interference in areas served by the positioning means, the channel allocation means being operative to determine if a channel is in use in an interfering zone by using the first condition and, if the first condition is not met, determining if the channel is in use in an interfering sub-zone by using the second condition.

2. A radio telephone system according to claim 1, wherein the positioning means are beacons in radio communication with the mobile radios.

3. A radio telephone system according to claim 2, wherein the radio telephone system is installed in a railway underground system and the beacons are train control beacons placed at intervals along the underground railway track.

4. A method of allocating a channel to a mobile radio in a radio telephone system having a plurality of base stations, comprising determining if a channel is in use in an interfering zone by using a first condition based on avoiding interference in areas served by the base stations and, if the first condition is not met, determining if the channel is in use in an interfering sub-zone by using a second condition based on avoiding interference in areas served by positioning means distinct from the base stations.

* * * * *